UNITED STATES PATENT OFFICE.

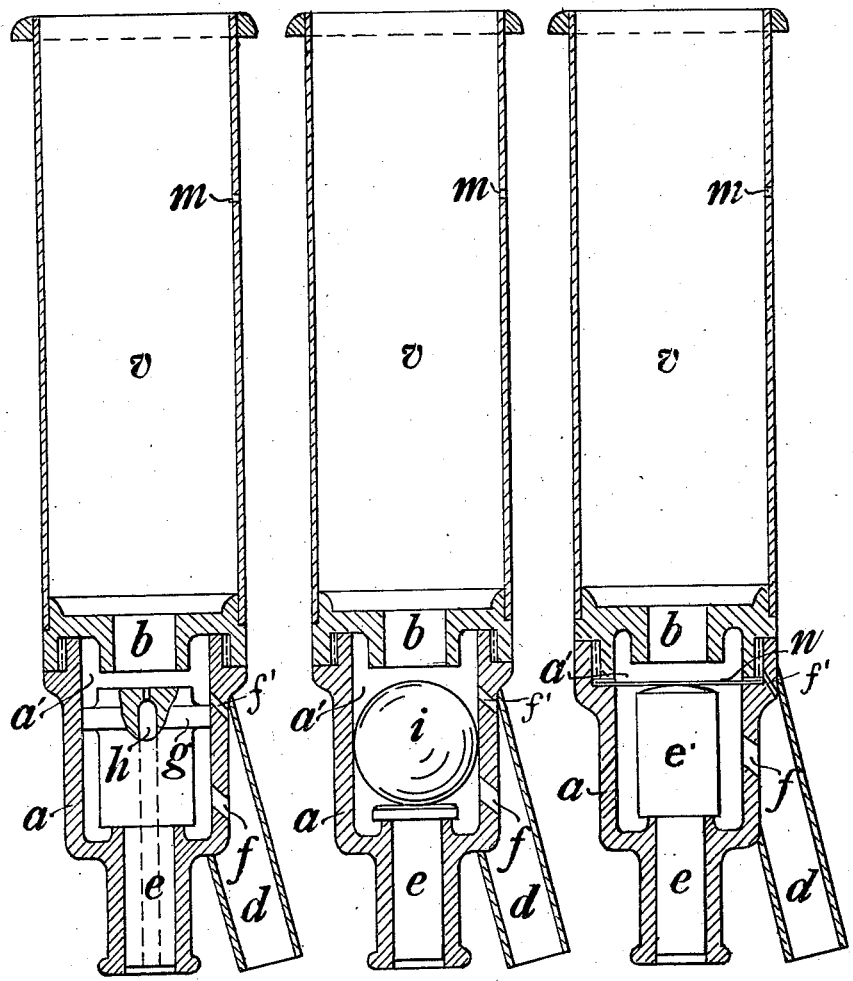

AXEL SABROE, OF HADERSLEBEN, GERMANY.

MILKING DEVICE.

1,159,103.  Specification of Letters Patent.  Patented Nov. 2, 1915.

Application filed December 16, 1911. Serial No. 666,205.

*To all whom it may concern:*

Be it known that I, AXEL SABROE, subject of the Emperor of Germany, residing at Hadersleben, Germany, have invented certain new and useful Improvements in Milking Devices, of which the following is a specification, reference being had therein to the accompanying drawing.

My invention relates to milking devices, has especial reference to that class of devices in which the suction in the milking cups is interrupted by atmospheric pressure when the milk ceases to flow, has for its object economy in construction, and consists in certain improvements which will be fully disclosed in the following specification and claims.

In the accompanying drawings, which form part of this specification:—Figure 1 represents a vertical transverse section partly in elevation of a milking cup or tube embodying my invention. Fig. 2 is a like view embodying a modification of my invention. Fig. 3 is a like view embodying another modification of the invention and Fig. 4 is a like view showing a further modification in which the lower part of the chamber $a$ is enlarged.

Reference being had to the drawings and the designating characters thereon, $v$ indicates a teat-cup connected to a member $a$ having a chamber $a'$ communicating with the teat-cup through opening $b$, and with the suction device, not shown, through tube $d$, and in the chamber $a'$ are means for closing the opening $b$ operated by a member $e$ whose lower end is exposed to atmospheric pressure, and the chamber $a'$ is divided into two compartments by the piston $g$ shown in Fig. 1, the ball $i$ shown in Fig. 2, or the diaphragm shown in Fig. 3 both of which compartments are in communication with tube $d$ through ports or passages $f$, $f'$, the former or lower port being of greater area than the latter or upper port.

In each of the three forms shown, the teat-cups are in communication with the atmosphere through port $m$.

In Fig. 1, the piston $g$ besides fitting in the chamber $a'$ has a lower reduced extension fitting within a reduced extension of said chamber, which is open to the atmosphere at its lower end, and a passage $h$ through the piston $g$ and the member $e$; said passage being contracted at its upper end, affords communication with the atmosphere and the interior of the teat-cup $v$.

In Fig. 2 the ball valve $i$, which is substantially of the same diameter as the chamber $a'$ rests on the upper end of the member $e$, at the lower end of the structure, which may be called a supplemental piston, and communication from the atmosphere to the teat-cup is had through the port $m$.

In Fig. 3 the closing device is provided with a flexible plate or diaphragm $n$ which vibrates in the chamber $a'$ and engages an extension $e'$ of the member $e$.

In Fig. 4 the chamber $a'$ is provided with the ball valve $i$ as in Fig. 2. In this construction the upper outlet $f'$ is omitted, to facilitate the cleaning of the device, which can be effected by increasing the diameter of that part of the chamber $a'$ in which the valve $i$ moves. The milk will then flow around the valve and will be discharged through the opening $f$.

The operation is as follows: As soon as the flow of the milk ceases, the passage $b$ is closed by the piston valve $g$, the ball valve $i$ or the diaphragm $n$, operated by atmospheric pressure upon the lower and exposed end of the member $e$ due to the air being exhausted from chamber $a'$ above and below the members $g$, $i$ or $n$ through ports $f$ and $f'$ and tube $d$ which latter is in communication with the suction device, when air will enter the teat-cup through port $m$ and relieve the vacuum in the teat cup. The increased pressure on the upper face of the valve will then cause the same to fall and again open the passage $b$, and the cup being again exhausted through the port $f'$ a pulsative action will be set up which will facilitate the flow of any remaining milk.

In the construction shown in Figs. 1, 2 and 3, the flow of milk is through the openings $f'$. As the piston, the valve or the diaphragm rise, the space below them increases and vice versa. The opening $f$ should be large enough so that no hindrance will occur from increased vacuum effects as the piston, the valve or the diaphragm move up and down.

If the necessary tension has been produced in the teat-cups, the closing device will open again; the operation will produce suction in the lower compartment $a'$ by means of the opening *f*. The milk in the teat-cups is withdrawn by suction and the operation is repeated successively.

When the ball *i* has some play in the chamber *a'* as in Fig. 4, the milk flows downward to the lower compartment thereof and through port *f* into the suction tube *d* and the flow of the milk will be continuous.

Having thus fully described my invention, what I claim is:

1. In a milking device, a teat-cup, a suction connection to said cup comprising a chamber in communication with the interior of the cup, and movable means separating said chamber into two compartments, both of which are in communication with the suction, said means adapted to close communication between the cup and the chamber and having an extension through the outer end of the chamber being adapted to be acted on by atmospheric pressure to regulate the flow of milk.

2. In a milking device, a teat-cup having an air port in the body thereof, a discharge at its lower end, a chamber below the teat-cup, means in said chamber dividing the same into two compartments adapted to control said discharge, and a suction connection in communication with both of said compartments.

3. In a milking device, a teat-cup provided with a suction connection, means for keeping said cup in constant communication with the atmosphere, a chamber adjacent to the suction connection, a discharge passage for milk being provided between the teat-cup and said chamber, means within the chamber for separating the same into two compartments and for controlling said discharge passage, and means for connecting the two compartments with the suction tube.

In testimony whereof I affix my signature in the presence of two witnesses.

AXEL SABROE.

Witnesses:
  WOLDEMAR HAUPT,
  HENRY HASPER.